3,782,913
Patented Jan. 1, 1974

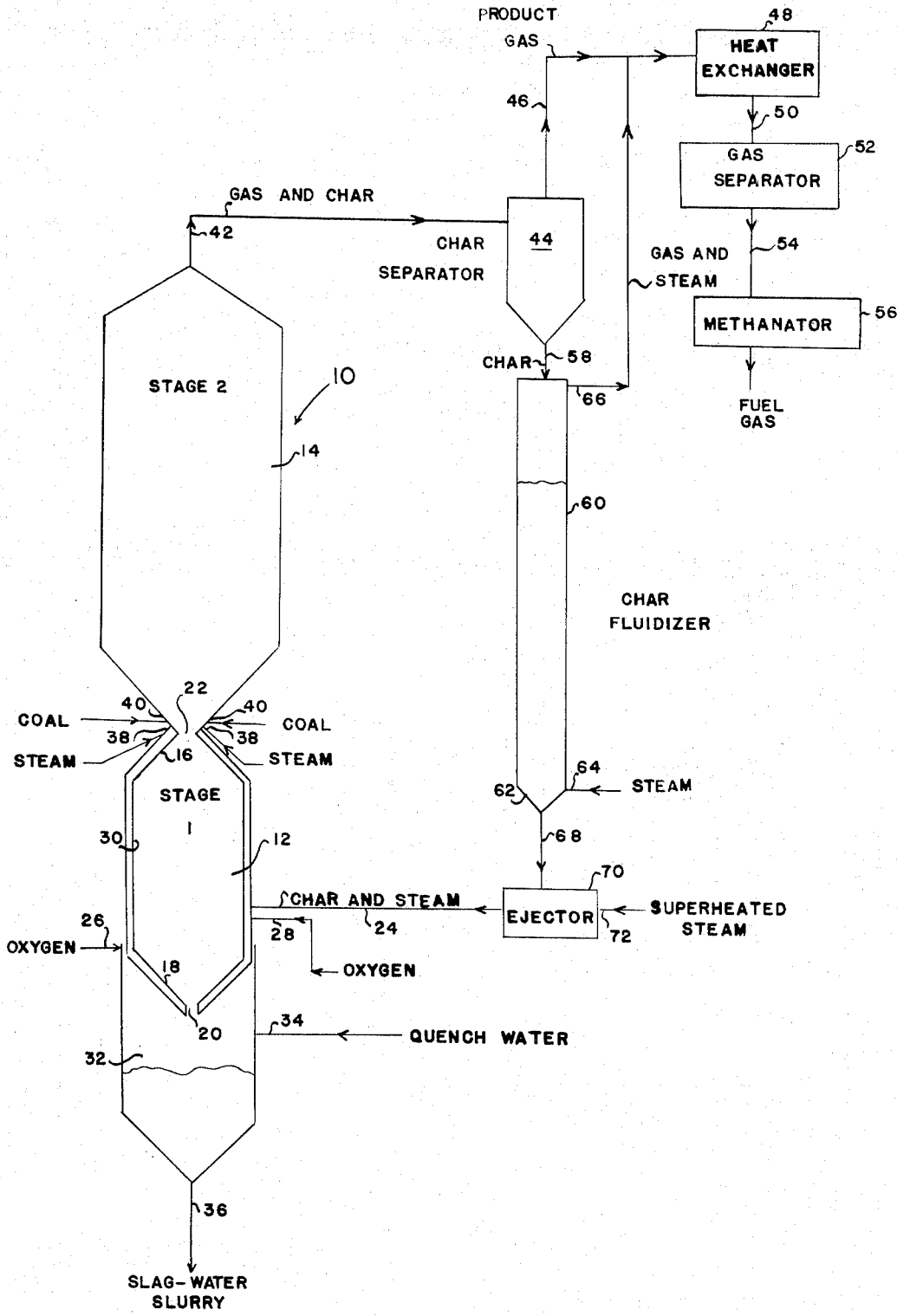

3,782,913
TWO-STAGE GASIFICATION OF COAL WITH FORCED REACTANT MIXING AND STEAM TREATMENT OF RECYCLED CHAR
Ernest E. Donath, St. Croix, Virgin Islands, assignor to the United States of America as represented by the Secretary of the Interior
Filed Mar. 23, 1972, Ser. No. 237,360
Int. Cl. C10j 3/00
U.S. Cl. 48—202     13 Claims

ABSTRACT OF THE DISCLOSURE

A process for the two-stage gasification of coal to produce methane-rich fuel gas. In the first stage, recycled processed char passes upwardly while reacting with steam and oxygen to yield a first stage synthesis gas containing hydrogen and oxides of carbon. In the second stage, the synthesis gas passes upwardly with coal and steam which react to yield partially gasified char entrained in a second stage product gas containing methane, hydrogen and oxides of carbon. The product gas from the second stage is separated from the char and is purified by conversion and removal of carbon oxides, hydrogen sulfide and other impurities, and the purified second stage product gas is methanated to produce the desired fuel gas. Char separated from the second stage product gas is passed through a fluidized bed and scrubbed with steam to remove product gas and other volatile materials which are carried by the scrubbing steam to the second stage product gas carried to purification. The scrubbed recycle char is carried by steam at high pressure and returned to the first stage. Agglomeration of coal in the second stage is prevented by the rapid heating of the coal to a temperature above its range of plasticity by mixing it with the hot products from the first stage. In the first stage the ratio of char and steam to oxygen is selected to obtain a reaction temperature above the ash melting point. The pressure in each stage exceeds 500 p.s.i.g. The second stage temperature exceeds 1500° F. and the first stage temperature exceeds 2200° F. Gas velocities in both stages are maintained between 2 and 12 feet per second while the residence time of solids in the first stage is from one-half to five seconds and, in the second stage, from five to fifteen seconds. A mixing stage between the first and second stages provides a restricted area for the injection of coal and steam into the upwardly flowing synthesis gas to separate solids and gases entering the second stage from the first stage and to assure rapid mixing and reaction of the reactants of both stages. Slag is removed from the lower end of the first stage for quenching and disposal through a slag removal port of small cross sectional area compared to the cross sectional area of the first stage. This assures residence and reaction time of the char in the first stage sufficient for its gasification with steam and oxygen at temperatures above the ash melting point. The relatively small area of the slag removal port permits controlled removal of molten slag while restricting the gravitation of char to the slag quenching stage.

BACKGROUND OF THE INVENTION

(1) Field of the invention

This invention relates to a process for production of methane-rich fuel gas for two-stage gasification of coal with forced rapid mixing of the reactants in each stage.

(2) Description of the prior art

Methane rich fuel gas is produced by a two-stage gasification process wherein particulate coal and steam are reacted in the second stage with synthesis gas from the first stage at temperatures in excess of 1600° F. and pressures in excess of 50 atmospheres to produce char and a product gas containing hydrogen, methane and oxides of carbon. The char and product gas are withdrawn and separated and the product gas is thereafter treated to remove carbon oxides and other diluents and is ultimately methanated to produce a methane-rich fuel gas. The char is recycled to the first gasification stage for reaction with steam and oxygen at temperatures in excess of 2500° F. and pressures in excess of 50 atmospheres to produce a synthesis gas containing hydrogen and oxides of carbon for reaction in the second gasification stage. A portion of the char, which has low sulfur content, can be burned to produce process energy. Ash produced from the reactions in the first and second stages gravitates, at least partially as molten slag, to the lower sections of the reactor in stage one where the ash and slag is cooled and removed from the process.

The two-stage gasification process described above was developed at Bituminous Coal Research, Inc., at Pittsburgh, Pa. (BCR). The process is described in a publication of the Department of Interior, Office of Coal Reseach (OCR), dated 1965 and entitled, "Gas Generator-Research and Development Survey and Evaluation." That process was described also in a computer study entitled, "Computer Study of Stage Two Reactions in the BCR Two-Stage Super Pressure Gasification Process," presented at the national meeting of the American Chemical Society, Division of Fuel Chemistry, Chicago, Ill., in September 1967.

SUMMARY OF THE INVENTION

This invention resides in a process for two-stage gasification of coal to produce methane-rich fuel gas. In the first stage, recycled process char passes substantially upwardly with steam and oxygen while reacting to yield a synthesis gas containing hydrogen and carbon oxides. In the second stage, the first stage synthesis gas passes upwardly while reacting with coal and steam to provide a second stage char entrained in a second stage product gas containing methane, hydrogen and carbon oxides. Temperatures, pressures, gas velocities, and residence times of the solids in the first and second stages are controlled and maintained to attain gasification of the char and melting of the ash to slag in the first stage and rapid reaction of the coal with the first stage products by rapid mixing of the two streams, thus assuring rapid heating of the coal above its range of plasticity in the second stage. Between the first and second stages, the synthesis gas is passed through a restricted mixing stage and coal and steam are injected into the mixing stage upwardly toward the second stage for rapid mixing and reaction of the coal and steam with the synthesis gas. The mixing stage has a cross sectional area substantially less than the cross sectional area of the smaller of the first and second stages to separate solids and gases entering the second stage from the first stage through the mixing stage. Second stage char and product gas are separated and the product gas is purified and methanated to yield the desired fuel gas while the separated char is recycled to the first stage. Molten slag intermixed with char, formed in the first stage, is removed therefrom at a controlled rate to assure sufficient residence time of slag and intermixed char to permit gasification in the first stage of char in the slag and to restrict gravitation of char from the first stage into a slag quenching stage below the first stage. The recycled char is scrubbed with steam in a fluidized bed to remove second stage product gas and impurities from the char, which is then recycled with high pressure steam to the first stage.

Passing the synthesis gas through the mixing stage with coal and steam to the second stage enables rapid heating of the coal to obtain a high methane yield in rapid reaction. High carbon utilization with low oxygen requirements is thus attained. Recycling steam-scrubbed char mixed with steam at very high pressures to the first stage minimizes the amount of hydrogen-rich gas fed into the first stage, thereby increasing the efficiency of the reaction of char with steam and oxygen to produce greater methane yield and carbon utilization with low oxygen consumption.

BRIEF DESCRIPTION OF THE DRAWING

The accompanying drawing is a diagrammatic illustration of apparatus adapted for use with the process of this invention.

DESCRIPTION OF THE PREFERRED EMBODIMENTS

In this specification, the term "coal" means any carbonaceous material including all ranks of coal, lignite, and the like.

The term "gasification" means the heating of coal in the presence of reacting agents whereby all or part of the volatile portion of the coal is liberated and the carbon in residual char is reacted with those reacting agents or with other reactants present in the gasification process.

The term "product gas" means a methane containing gas such as the gas produced in the second stage of the two stage gasification process described therein.

In the drawing, a two-stage gasification vessel, indicated generally by reference numeral 10, has a lower portion 12 and an upper portion 14. The first stage of the gasification process takes place in the vessel lower portion 12 and the second stage takes place in the upper portion 14. The gasification vessel lower portion 12 will also be referred to as the first gasification stage or zone portion of vessel 10 and the upper portion 14 will be referred to as the second gasification stage or zone portion of gasification vessel 10. The gasification vessel lower portion 12 has an upper truncated conical portion 16 and a lower truncated conical portion 18. The downwardly converging walls of the lower truncated portion 18 converge to form a slag removal area or port 20. The upwardly converging conical walls of the upper portion 16 of first stage 12 converge to form a throat 22 between the vessel upper portion 14 and lower portion 12. Both slag port 20 and throat 22 have cross sectional areas substantially less than the cross sectional area of the central or intermediate part of the cylindrical vessel lower portion 12.

Recycle process char mixed with steam at high pressure is injected into the vessel lower portion 12 through conduit 24 and reacted therein with oxygen introduced into the vessel lower portion 12 through suitable conduits 26 and 28 respectively. The char, oxygen and steam are introduced and injected into the first stage at a high velocity and in such fashion that rapid mixing and reaction of the reactants occur and that a rotating motion of the reactants, passing upwardly as a vortex through the lower portion of the vessel 12, results. The reaction in the vessel lower portion 12 is the first stage of the gasification process and produces a synthesis gas containing hydrogen and oxides of carbon, which synthesis gas passes upwardly through the throat 22 into the vessel upper portion 14.

The physical conditions of the reaction in the first stage of the process are controlled and maintained to assure rapid gasification of the char at temperatures exceeding the melting point of ash produced by char gasification to produce a molten slag from the melted ash having a slag viscosity not greater than approximately 50 poises. The temperature in the first stage should be maintained between approximately 2200 and 3800° F. and preferably between approximately 2400 and approximately 3200° F. Pressure in the first stage of the process should be maintained between approximately 500 to approximately 2000 p.s.i.g. and preferably between approximately 750 to 1500 p.s.i.g. The velocity of gases passing through the first stage should be from approximately 2.0 to approximately 12.0 feet per second, and preferably from about 5.0 to approximately 10.0 feet per second. The residence time of char in the first gasification stage should be from about 0.5 second to approximately 5.0 seconds and preferably within the range of from about 1.0 to about 3.0 seconds.

At the reaction temperatures in the first stage in the vessel lower portion 12, ash formed by the gasification of char therein melts to form molten slag which is transported through stage one in the rotating upwardly moving vortex of gases and char ascending through the vessel lower portion 12. The rotation imparted to the ascending reactants in the first stage causes particles of molten slag to collect on the wall 30 of the reactor in the vessel lower portion 12. The reactor wall 30 of the lower portion 12 is water cooled to enhance slag accumulation thereon.

Particles of partially gasified char are entrained with the particles of molten slag accumulating on the water cooled wall 30 of the reactor lower portion 12. The char entrained in the molten slag on the reactor wall is gasified with oxygen and steam passing upwardly through the vessel lower portion 12. It is desirable to remove slag during the first stage of the gasification process in a controlled manner to prevent the accumulation of excess slag from interfering with the reaction process in the first stage while maintaining a residence time of slag with entrained char in the first stage to permit gasification of the char in the slag prior to slag removal. Controlled removal of char from the first stage of the process is desired also to restrict gravitation of substantial amounts of unreacted char from the lower portion of the vessel into the lower slag quenching vessel 32 positioned below the gasification vessel 10, thus conserving the char for process use. That objective is achieved by withdrawing a portion of the molten slag containing char as the slag flows downwardly along the walls 30 of the vessel lower portion 12. The lower truncated portion 18 of the reactor lower portion 12 is conically truncated and converges to form a slag removal port 20 having a cross sectional area substantially less than the cross sectional area of the intermediate part of vessel lower portion 12 to control the rate of slag removal through slag port 20 to assure the desired residence time for char-containing slag in vessel lower portion 12 and to prevent gravitation of substantial amounts of char from the vessel lower portion 12. The truncated lower portion 18 and port 20 serve as a slag removal zone in the vessel 10. To provide the desired rate of slag removal through slag port 20, the cross sectional area of slag port 20 preferably should be less than 4% of the area of the cylindrical portion of vessel lower portion 12.

After removal through slag port 20, the slag is introduced into a slag quenching vessel 32 and cooled with water introduced through conduit 34 to form a slag-water slurry which collects in the lower portion of quenching vessel 32 and is withdrawn therefrom through conduit 36 for disposal from the system.

First stage synthesis gas passes upwardly through the upper conical portion 16 of the vessel lower portion 12 through throat 22 where synthesis gas is rapidly mixed with coal and steam. Throat 22 should have a cross sectional area preferably less than 20% of the cross sectional area of the smaller of the lower and upper portions 12 and 14 of vessel 10 to restrict gravitation of coal downwardly through throat 22. Near the most narrow cross sectional area of throat 22, superheated steam is injected upwardly through a plurality of ports or nozzles 38 surrounding throat 22. It is preferred that at least ten steam nozzles 38 be employed and that they be directed radially upward toward upper portion 14 of vessel 10 to restrict the entry of coal into throat 22 and into the vessel lower portion 12 when the first stage of the gasification process takes place from the vessel upper portion 14 where the second stage of the gasification process takes place. At locations above the steam ports 38 in throat 22, coal is introduced into the throat 22 through ports 40 for rapid mixing with the synthesis gas and injected steam passing upwardly through throat 22. The portion of the vessel where the steam and coal are introduced may also be referred to as the mixing zone portion of the vessel. The synthesis gas, injected steam, and coal are passed through throat 22 into the lower portion of the vessel upper portion 14 where the second stage of the gasification process takes place in such fashion and manner to assure rapid mixing contact among the coal particles, steam and synthesis gas in an upwardly moving vortex and assure rapid reaction and substantial gasification of the coal at temperatures above the range of the coal's plasticity. The velocities of the steam and coal streams from their respective nozzles or ports 38 and 40 in an near throat 22 should be at least twice the velocity of the synthesis gas stream entering throat 22 from the vessel lower portion 12 and is preferably at least approximately 50.0 feet per second. The mixture of coal, steam and synthesis gas passes upwardly through the vessel upper portion 14 while reacting to yield a second stage product including partially gasified char entrained with a second stage product gas comprising methane, hydrogen and oxides of carbon.

The wall of the reactor vessel upper portion 14 should be lined with a refractory material in order to reduce heat loss and provide for better temperature control. The physical conditions of the reaction in the second stage of the gasification process are controlled to assure rapid gasification and heating of the coal above its range of plasticity. In the second stage, the temperature should be maintained between approximately 1500 and 2000° F. and preferably between approximately 1600 to approximately 1900° F. The pressure should be maintained within the range of from approximately 500 to approximately 2000 p.s.i.g., and preferably within the range of from approximately 750 to approximately 1500 p.s.i.g. The velocity of gases passing through the vessel upper portion 14 should be maintained within the range of from about 2.0 to approximately 12.0 feet per second and preferably within the range of from approximately 4.0 to approximately 8.0 feet per second. The residence time in the second stage should be maintained within the range of from approximately 5.0 to approximately 15.0 seconds.

It is desired in the process of this invention to provide rapid mixing and reaction of reactants in the first and second gasification stages while minimizing residence times therein to assure rapid reaction of coal above its range of plasticity and rapid gasification of char above the char-ash melting temperature. For that reason, it is desirable that the velocity from the feed nozzles for each reactant in both the first and second stages be controlled and maintained at a velocity of at least twice the velocity of each of the reactant-product streams passing through the vessel in the first and second stages of the process. It is preferred that the feed nozzle velocities be maintained within the range of from about 30 to about 200 feet per second and that, if there is more than one feed nozzle, the flow velocities of feed streams from each nozzle be substantially different. It is also desirable that throughput rates in both stages be controlled to provide rapid mixing and reaction with a minimization of residence time.

The product of the second stage is withdrawn from the upper portion of vessel 10 through conduit 42 and introduced into a cyclone separator 44 where partially gasified char from the second stage is separated from the second stage product gas. The separated product gas is withdrawn through conduit 46 and passed to a heat exchanger 48 where process heat is recovered and the product gas cooled. The product gas is conveyed through conduit 50 to a separator 52 wherein the stage two product gas is treated to remove carbon oxides, hydrogen sulfide, and other impurities. After purification, the stage two product gas is passed through conduit 54 to methanator 56 where the purified product gas is catalytically methanated to produce a fuel gas containing at least 70% methane by volume.

Partially gasified char, with some product gas entrained therewith, is removed from cyclone separator 44 and conducted through conduit 58 to a char fluidizer vessel 60 wherein the char passing downwardly is maintained as a fluidized bed by superheated steam introduced into the lower portion 62 of char fluidization vessel 60. Steam introduced through conduit 64 passes upwardly through vessel 60 and fluidizes the char. The steam scrubs the char to displace therefrom the stage two product gas mixed with the char.

The superheated scrubbing steam exits from the upper level of the fluidized bed of char in the fluidization vessel 60 with the product gas displaced from the fluidized bed of char and is withdrawn with the product gas through conduit 66 and conveyed to conduit 46 where the scrubbing steam and product gas from the fluidization vessel 60 are mixed with the stream of second stage product gas from cyclone separator 44 prior to delivery of those gases to heat recovery exchanger 48.

The char withdrawn from the lower portion of fluidization vessel 60, having been scrubbed and heated by the superheated scrubbing steam, is conducted through conduit 68 to a steam ejector 70 where the scrubbed char is mixed with additional superheated steam introduced into the ejector 70 through conduit 72 and conducted from steam ejector 70 through conduit 24 to the gasification vessel lower portion 12 for recycling and further reaction in the process. The steam entering ejector 70 should be superheated and have a pressure at least 1.3 times and preferably more than 1.8 times the pressure in the first gasification stage of the gasification process to assure rapid feeding and mixing of the reactants in the first gasification stage and to assist in providing the desired ascending rotational motion to the reactants in gasification vessel lower portion 12.

According to the provisions of the patent statutes, I have explained the principle, preferred construction and mode of operation of my invention and have illustrated and described what I now consider to represent its best embodiment. However, it should be understood that, within the scope of the appended claims, the invention may be practiced otherwise than as specifically illustrated and described.

I claim:

1. A process for the two-stage gasification of coal comprising:
   passing recycle char upwardly through a first zone and reacting said char therein with superheated steam and oxygen to yield a first stage synthesis gas comprising hydrogen and oxides of carbon,
   controlling the reaction in said first zone such as the temperature, pressure, gas velocities therethrough and residence time of the char and other solids therein to assure rapid gasification of the char at temperatures above the melting temperature of ash formed from the char,
   passing the first stage synthesis gas from the first zone through a mixing zone having a cross sectional area substantially less than the cross sectional area of the first zone,
   injecting coal and superheated steam into said mixing zone and mixing said coal and superheated steam with the first stage synthesis gas passing therethrough,
   passing the mixture of steam, coal and first stage synthesis gas from the mixing zone into a second gasification zone,
   controlling the velocities and direction of flow of the steam and coal injected into the mixing zone to prevent the entry of coal and gases from the second zone into the mixing zone, passing the mixture of coal, steam and first stage synthesis gas upwardly through the second zone while reacting the mixture to yield a second zone product comprising char entrained in a second zone product gas comprising methane, hydrogen, and oxides of carbon, controlling in the second zone the temperature, pressure, gas velocity, and residence time of the coal and other solids therein to assure rapid gasification of the coal beyond the range of coal plasticity, withdrawing the second zone product from said second zone and separating said product into char and second zone product gas, treating said separated char with a second gas to displace second zone product gas entrained with the separated char, introducing said second zone product gas into a purification zone and removing therefrom oxides of carbon, hydrogen sulfide and other impurities, combining said displaced product gas and a portion of said second gas with said second zone product gas, methanating said purified product gas to yield a fuel gas containing at least 70% methane, and recycling the separated char to the first gasification zone.

2. The process of claim 1 wherein synthesis gas, coal and steam are introduced into a mixing zone having a cross sectional area less than 20% of the smaller of the cross sectional areas of each of the first and second gasification zones.

3. The process of claim 1 comprising maintaining the temperature in the first gasification zone in a range from approximately 2200 to approximately 3800° F. and maintaining the temperature in the second gasification zone in the range of between about 1500° F. and 2000° F.

4. The process of claim 1 comprising maintaining the pressure in each of the first and second gasification stages within the range of between about 500 p.s.i.g. to approximately 2000 p.s.i.g.

5. The process of claim 1 comprising maintaining the velocity of gases in the first gasification zone between about 2.0 feet per second and 12.0 feet per second and maintaining the velocity of gases passing through the second gasification zone between about 2.0 feet per second and 12.0 feet per second.

6. The process of claim 1 comprising maintaining a residence time of the gases in the first gasification zone between about 0.5 and 5.0 seconds and maintaining a residence time of gases in the second gasification zone between about 5.0 seconds and 15.0 seconds.

7. The process of claim 1 comprising injecting both the coal and the steam into the mixing zone at individual velocities at least twice the individual velocities of the streams of reactants and products passing through the first and second gasification zones.

8. The process of claim 1 comprising injecting steam and coal into the mixing zone at velocities within the range from approximately 30 to approximately 200 feet per second.

9. The process of claim 1 comprising injecting steam into the mixing zone in a direction toward the second gasification zone from a plurality of locations adjacent the mixing zone and controlling the direction and velocity of steam injection to separate the solids and gases entering the second zone from the first zone and to prevent the passage of coal downwardly from the second gasification zone through the mixing zone.

10. The process of claim 1 comprising passing molten slag formed in the reaction in the first gasification zone downwardly through said zone and through a slag removal zone at the lower end of the first gasification zone, providing a cross sectional area in a reactor in the slag removal zone such that a preselected portion of the slag, formed in the first gasification zone and having partially gasified char entrained therein, remains in the first zone for a preselected length of time to permit reaction of char entrained in said slag with steam and oxygen injected into said first zone so that a substantial portion of the entrained first zone char is gasified.

11. The process of claim 10 comprising providing a slag removal zone having a cross sectional area of less than approximately 4% of the cross sectional area of the first gasification zone.

12. The process of claim 1 comprising:
passing the separated char through a fluidization zone,
moving the char downwardly through the fluidization zone while passing steam upwardly through said zone to fluidize said char and remove second stage product gas and other volatile materials entrained with said char, and
withdrawing steam and product gases and other volatile materials from the char fluidization zone and mixing said steam, gas and volatile materials with the second stage product gas passing to the purification zone.

13. The process of claim 1 comprising mixing the separated char to be recycled to the first zone with superheated steam and introducing said mixture of recycled char and superheated steam into the first zone using a steam ejector driven by superheated steam at approximately 1.3 to approximately 1.8 times the pressure maintained in the first gasification zone.

References Cited
UNITED STATES PATENTS

| | | | |
|---|---|---|---|
| 2,687,950 | 8/1954 | Kalbach | 48—210 X |
| 2,691,573 | 12/1954 | Mayland | 48—210 |
| 2,840,462 | 6/1958 | Gorin | 48—202 X |
| 3,556,749 | 1/1971 | Spacil | 48—202 X |
| 3,684,689 | 8/1972 | Patton et al. | 48—197 X |

MORRIS O. WOLK, Primary Examiner

R. E. SERWIN, Assistant Examiner

U.S. Cl. X.R.

48—210